(12) United States Patent
Dunjic et al.

(10) Patent No.: US 11,004,141 B2
(45) Date of Patent: May 11, 2021

(54) SYSTEM AND METHOD TO DIRECT PROCESSING OF ORDERS TO IMPROVE PROCESSING RESOURCE USAGE

(71) Applicant: THE TORONTO-DOMINION BANK, Toronto (CA)

(72) Inventors: Milos Dunjic, Oakville (CA); Anthony Haituyen Nguyen, Toronto (CA); Yubing Liu, Toronto (CA)

(73) Assignee: THE TORONTO-DOMINION BANK, Toronto (CA)

( * ) Notice: Subject to any disclaimer, the term of this patent is extended or adjusted under 35 U.S.C. 154(b) by 251 days.

(21) Appl. No.: 16/142,496

(22) Filed: Sep. 26, 2018

(65) Prior Publication Data

US 2020/0098035 A1    Mar. 26, 2020

(51) Int. Cl.
    *G06Q 30/00*      (2012.01)
    *G06Q 30/06*      (2012.01)
    *H04W 4/02*      (2018.01)

(52) U.S. Cl.
    CPC ........ *G06Q 30/0635* (2013.01); *H04W 4/023* (2013.01)

(58) Field of Classification Search
    CPC .................................................. G06Q 30/0635
    See application file for complete search history.

(56) References Cited

U.S. PATENT DOCUMENTS

| | | | |
|---|---|---|---|
| 5,774,663 A | 6/1998 | Randle et al. | |
| 7,624,073 B1 | 11/2009 | Robinson et al. | |
| 7,752,146 B2 | 7/2010 | Lert, Jr. | |
| 7,778,937 B2 | 8/2010 | Ferrara et al. | |
| 8,091,778 B1 | 1/2012 | Block et al. | |
| 8,458,096 B2 | 6/2013 | O'Laughlin et al. | |
| 8,548,912 B2 | 10/2013 | Cincera | |
| 9,432,804 B2 | 8/2016 | Hanson et al. | |
| 9,811,856 B2 | 11/2017 | Mishra et al. | |

(Continued)

FOREIGN PATENT DOCUMENTS

| | | |
|---|---|---|
| CN | 104182849 A | 12/2014 |
| CN | 106897928 A | 6/2017 |
| WO | 2004027723 A1 | 4/2004 |

OTHER PUBLICATIONS

Bulut, Muhammed Fatih, et al. "Lineking: Crowdsourced line wait-time estimation using smartphones." International Conference on Mobile Computing, Applications, and Services. Springer, Berlin, Heidelberg, 2012.*

(Continued)

*Primary Examiner* — Kathleen Palavecino

(57) ABSTRACT

There is provided a system and method to direct processing of orders to improve processing resource usage. QOS statistics relative to wait times and/or processing times or other measures of busyness may be maintained relative to physical office or branch locations where customers attend to have orders processed. QOS measures may be defined relative to these statistical measures of busyness that predict future busyness at respective locations. The QOS measures may be provided to a customer, such as in association with an order ahead application, to recommend to the customer to attend at a location that is less busy thereby distributing processing requests (orders) to less busy locations and better utilize resources.

19 Claims, 9 Drawing Sheets

(56) References Cited

U.S. PATENT DOCUMENTS

| | | |
|---|---|---|
| 2006/0253358 A1 | 11/2006 | Delgrosso et al. |
| 2009/0106069 A1 | 4/2009 | Asakura et al. |
| 2009/0228325 A1* | 9/2009 | Simmons ........... G06Q 30/0601 |
| | | 705/7.23 |
| 2017/0228835 A9 | 8/2017 | Lin |

OTHER PUBLICATIONS

Kirill Tsernov; How to Reduce Queues in Banks; Article; January 30, 2018; 8 Pages; https://www.qminder.com/bank-queues/.
Queue Management Systems in Bahrain; Article; 5 Pages; https://technology-valley.net/queue-management-systems-in-bahrain/.
Managing Long Queues During Peak Business Hours Has Always Been a Huge Problem for Banks; Article; 2014; 2 Pages; http://queuemanagementsystems.com/solutions/banking/.

* cited by examiner

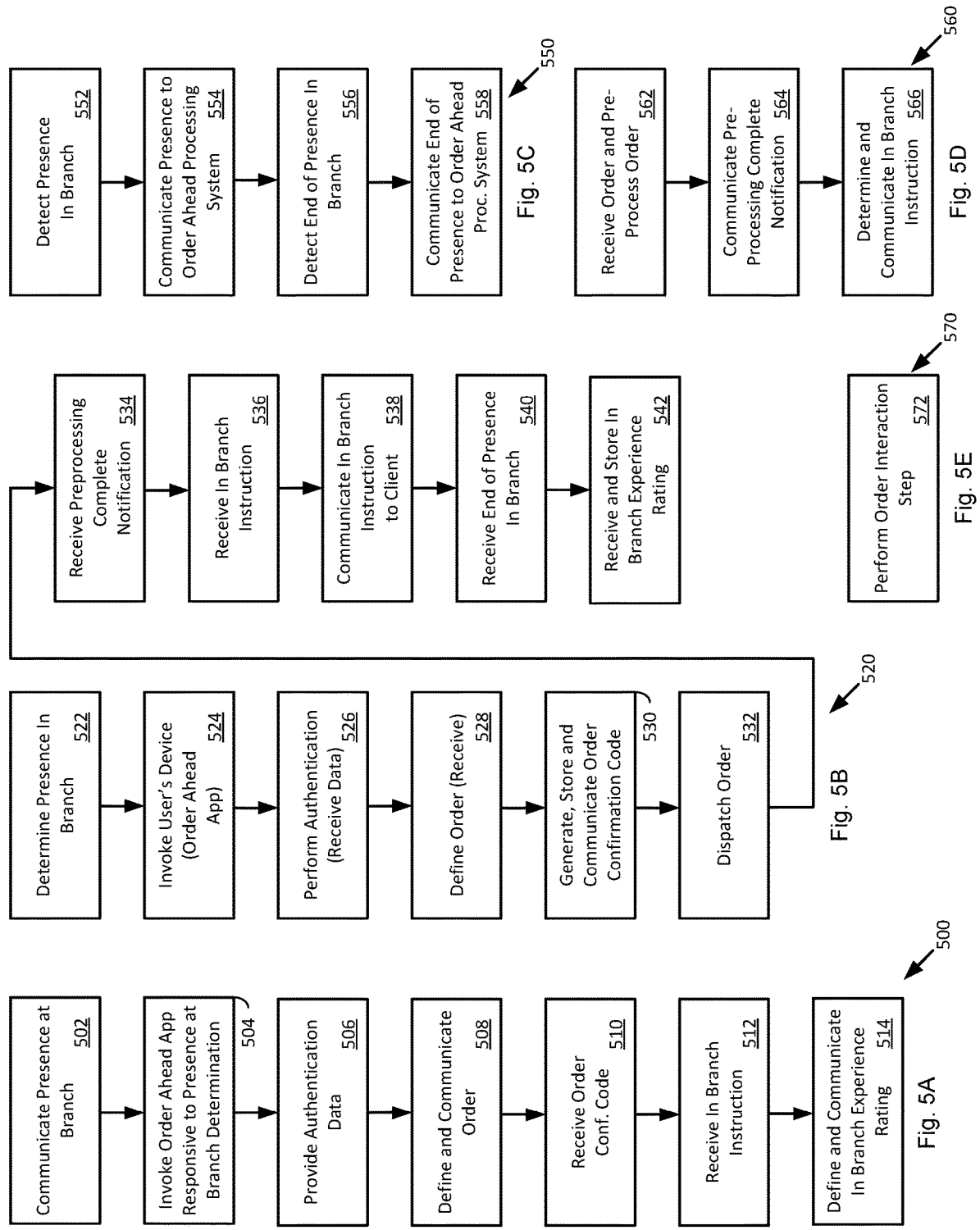

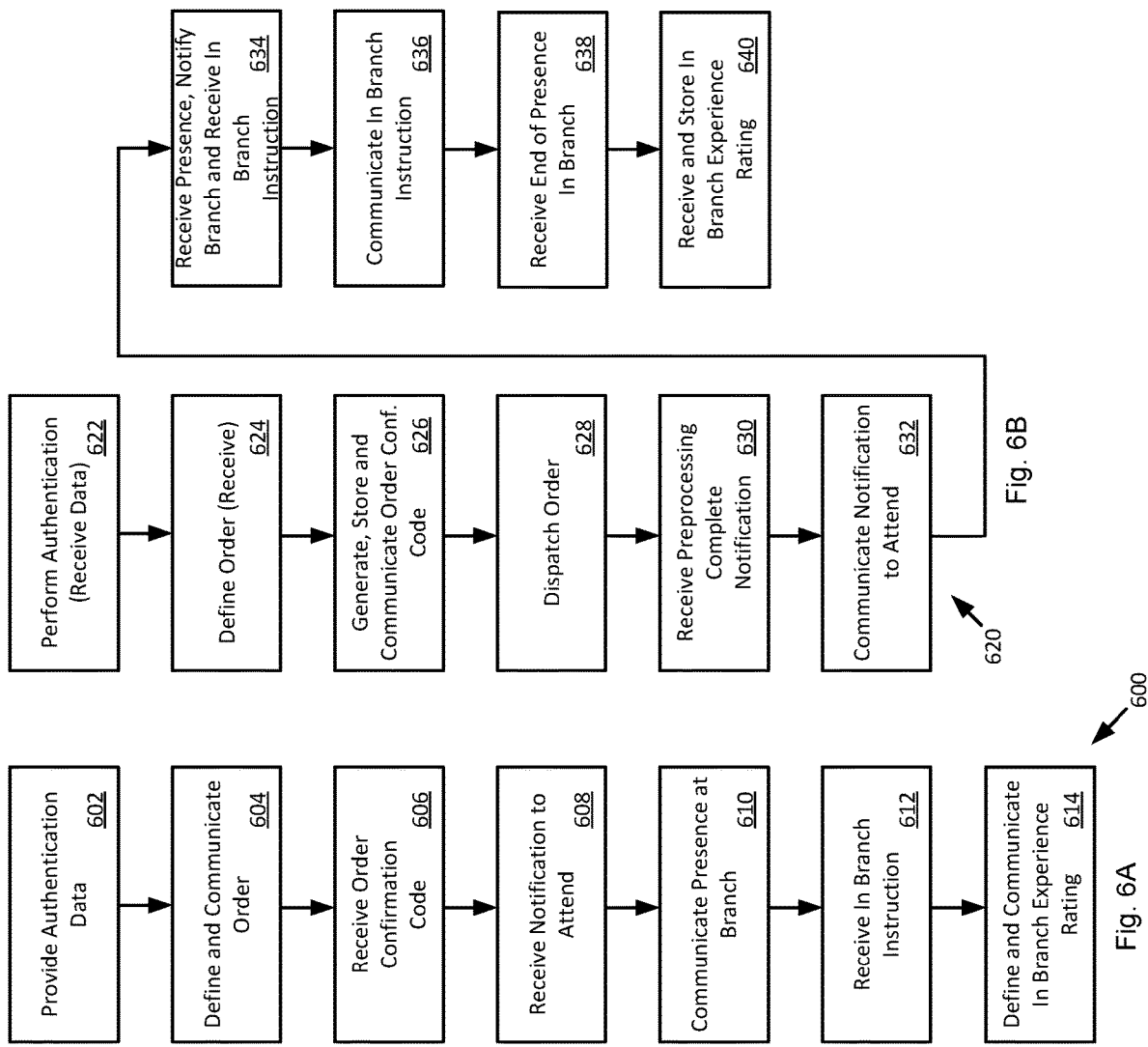

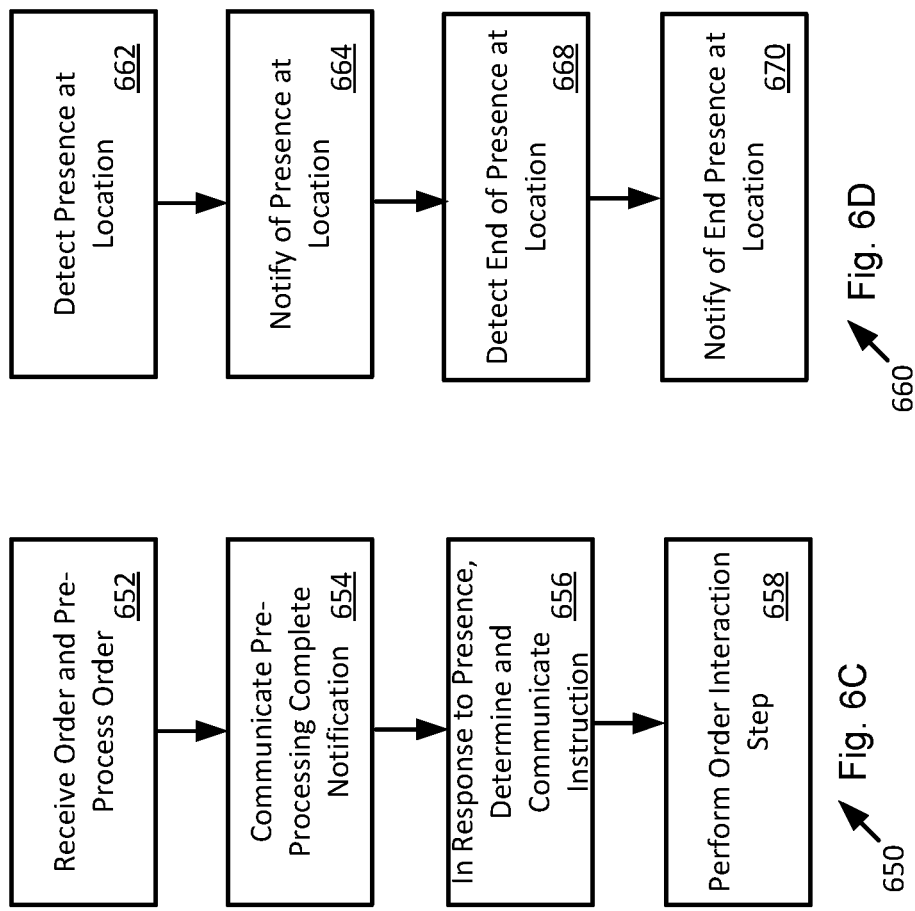

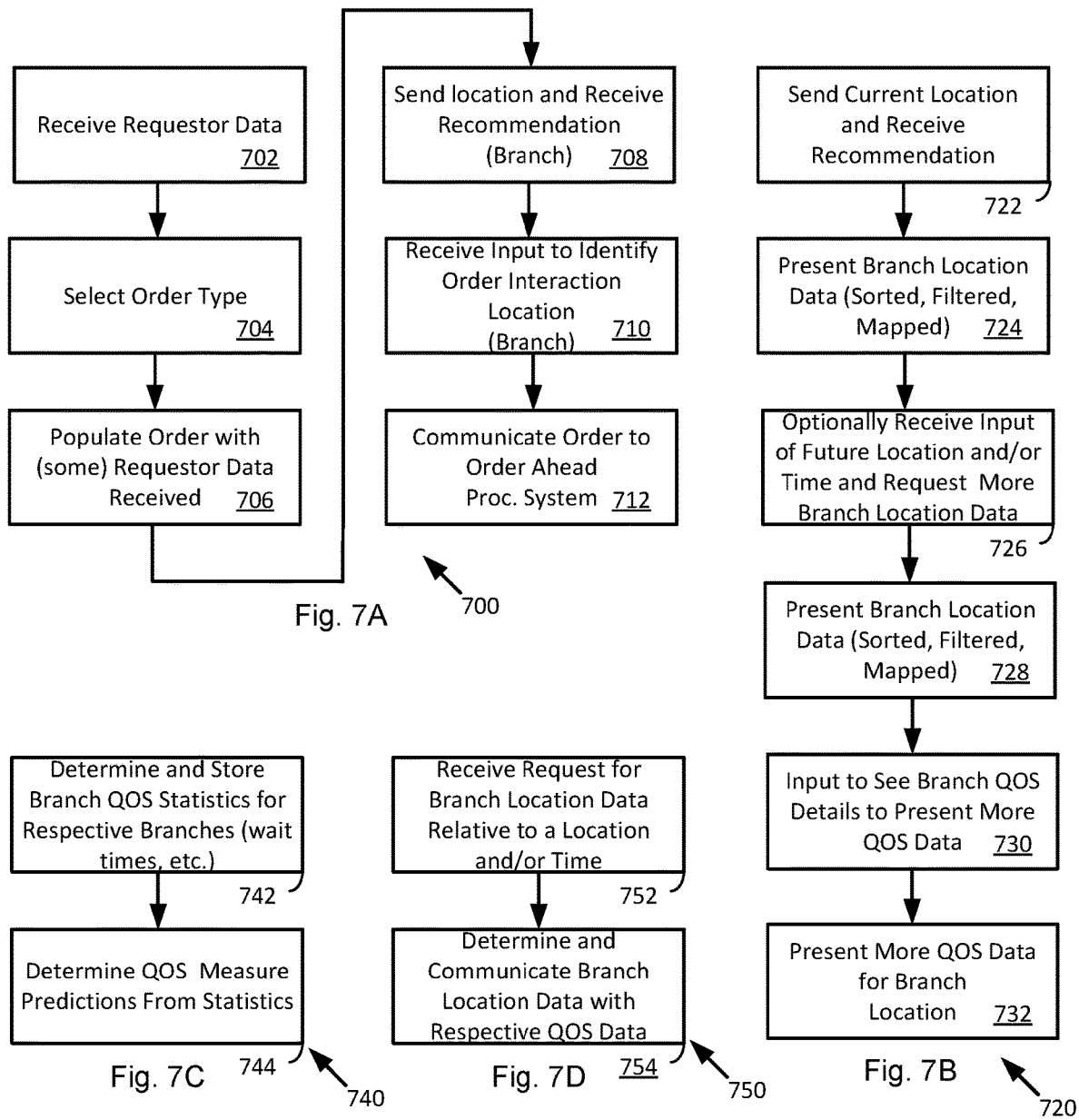

SYSTEM AND METHOD TO DIRECT PROCESSING OF ORDERS TO IMPROVE PROCESSING RESOURCE USAGE

FIELD

The present disclosure relates to computer systems, particularly distributed systems having order processing interfaces distributed about a geographic area and more particularly to a system and method to direct processing of orders to improve processing resource usage.

BACKGROUND

Many businesses have order processing interfaces (a computer interface) at physical locations, such as a local office, distributed about a geographic area. Some businesses may have dozens or hundreds of locations in a major center such as a city. An order processing interface may be operated by an employee of the business to facilitate processing an order for a customer or may be operated by the customer themselves. Often the order processing interface communicates with one or more remotely located processing systems. In one example, the order processing interface may be provided by an employee's computer in a location.

Many customers may present at a location about the same time to initiate orders via one or more computing devices at the location such that the location becomes busy, requiring customers to wait in a queue. Yet, resources nearby at another location may be idle or lightly used providing excess and underused capacity.

SUMMARY

There is provided a system and method to direct processing of orders to improve processing resource usage. Quality of Service (QOS) statistics relative to wait times and/or processing times or other measures of busyness may be maintained relative to physical office or branch locations where customers attend and request orders to be processed. QOS measures may be defined relative to these statistical measures of busyness that predict future busyness at respective locations. The QOS measures may be provided to a customer, such as in association with an order ahead application, to recommend to the customer to attend at a location that is less busy thereby distributing processing requests (orders) to less busy locations and better utilize resources.

There is provided a computing device comprising a processor, a storage device storing instructions and a communication component, wherein the instructions, when executed by the processor, configure the computing device to: receive from a requesting device an order for processing, the order including an order interaction processing step to be performed at an order interaction location with an attendance by a requestor of the order, the order interaction location comprising one of a plurality of order interaction locations; determine and provide to the requesting device an order interaction location recommendation comprising a potential order interaction location for the attendance from the plurality of order interaction locations, wherein the order interaction location recommendation is responsive to one or more of a requestor location and a time for the attendance and wherein the potential order interaction location is determined according to at least a proximity of the potential order interaction location to the requestor location and wherein the order interaction location recommendation is further responsive to or includes a QOS measure for the potential order interaction location; receive from the requesting device an identification of the order interaction location; define the order comprising the order interaction location; and dispatch the order to be processed by one of a plurality of order processing devices ahead of the order interaction processing step.

The order interaction location recommendation may comprises data representing a plurality of potential order interaction locations selected in response to respective proximities to the requestor location and a respective QOS measure for each of the plurality of potential order interaction locations.

The instructions may further configure the computing device to receive, store and determine QOS data for each of the plurality of order interaction locations from which to determine each respective QOS measure. The QOS data may be responsive to at least some of: time of day; date; wait times and/or processing times at order interaction locations; requestor ratings for processing of orders; an order type of the order; and measures of order processing volumes relative to respective order interaction locations. Each respective QOS measure may be a prediction of a quality of service at the time for the attendance.

To dispatch the order may comprise dispatching the order for processing by a respective order processing device located at the order interaction location.

To dispatch the order may comprise dispatching the order for processing by a respective order processing device located remotely from the order interaction location, the respective order processing device storing at least partially completed order data for later completion of the order by a second order processing device located at the order interaction location.

The requestor location may be one of: a current location of the requesting device as automatically determined from location information received from the requesting device; and a future location of the requestor communicated from the requesting device.

The instructions may configure the computing device to receive one or more of a second requestor location and a second time and in response, provide an updated order interaction location recommendation.

To receive the order may comprise receiving authentication data from the requesting device and authenticating the requestor of the order. To receive the order may further comprise: obtaining requestor data comprising account information from a data store responsive to the authenticating; and communicating the requestor data to the requesting device for use to define the order.

The instructions may further configure the computing device to, prior to receiving the order: in response to a presence of a requesting device and/or requestor at a first order interaction location of the plurality of order interaction locations, receive or determine a presence indicator for the requesting device and or requestor; and responsive to the presence indicator, communicate to the requesting device to invoke an order application executed on the requesting device with which to define the order. The instructions may configure the computing device to receive a presence indicator from a presence device located at the first order interaction location, the presence device configured to at least one of: determine and communicate the presence indicator responsive to biometric information determined for the requestor; and communicate with the requesting device when the requesting device is within the first order interaction location and define and communicate the presence indicator. The identification of the order interaction location may identify a second order interaction location having a different location than the first order interaction location.

The instructions may further configure the computing device to communicate a notification to attend at the order interaction location in response to a readiness to perform the order interaction processing step.

The instructions may further configure the computing device to, following dispatching the order: in response to a presence of a requesting device and/or requestor at the order interaction location, receive or determine a presence indicator for the requesting device and or requestor; optionally receive requestor instructions to provide to the requestor device; and responsive to the presence indicator, maintain QOS data.

The instructions may further configure the computing device to communicate requestor instructions to the requesting device, the requestor instructions to be performed by the requestor to enable performing the order interaction processing step at the order interaction location. The requestor instructions may comprise instructions to attend with an item required to perform the order interaction processing step.

To dispatch the order to a respective order processing device comprises submitting the order to an order processing queue for pre-processing by the respective order processing device of a plurality of respective order processing devices configured to pre-process orders and having access to the order processing queue. The respective order processing device may be a remote order processing device located remotely from the order interaction location and the order interaction processing step is performed by a local order processing device located at the order interaction location.

There is provided a computing device comprising a processor, a storage device storing instructions, and a communication component, wherein the instructions, when executed by the processor, configure the computing device to: define and provide an order to an order ahead processing system configured to receive the order from a requesting computing device, the order including an order interaction processing step to be performed at an order interaction location with attendance by a requestor of the order, the order interaction location comprising one of a plurality of order interaction locations; receive and present from the order ahead processing system an order interaction location recommendation comprising a potential order interaction location for the attendance from the plurality of order interaction locations, wherein the order interaction location recommendation is responsive to one or more of a requestor location and a time for the attendance and wherein the potential order interaction location is determined according to at least a proximity of the potential order interaction location to the requestor location, and wherein the order interaction location recommendation is further responsive to or includes a quality of service measure for the potential order interaction location; and, provide to the order ahead processing system an identification of the order interaction location for use to process the order.

The instructions may configure the computing device to receive a notification to attend at the order interaction location in response to a readiness to perform the order interaction processing step.

There is provided a computer implemented method comprising, by a processor: receiving from a requesting device an order including an order interaction processing step to be performed at an order interaction location with an attendance by a requestor of the order, the order interaction location comprising one of a plurality of order interaction locations; determining and providing to the requesting device an order interaction location recommendation comprising a potential order interaction location for the attendance from the plurality of order interaction locations, wherein the order interaction location recommendation is responsive to one or more of a requestor location and a time for the attendance and wherein the potential order interaction location is determined according to at least a proximity of the potential order interaction location to the requestor location and wherein the order interaction location recommendation is further responsive to or includes a quality of service measure for the potential order interaction location; receiving from the requesting device an identification of the order interaction location; defining the order comprising the order interaction location; and dispatch the order to be processed by one of a plurality of order processing devices ahead of the order interaction processing step.

There is provided a computer implemented method comprising, by a processor: defining and providing an order to an order ahead processing system configured to receive the order from a requesting computing device, the order including an order interaction processing step to be performed at an order interaction location with attendance by a requestor of the order, the order interaction location comprising one of a plurality of order interaction locations; receiving from the order ahead processing system and presenting an order interaction location recommendation comprising a potential order interaction location for the attendance from the plurality of order interaction locations, wherein the order interaction location recommendation is responsive to one or more of a requestor location and a time for the attendance and wherein the potential order interaction location is determined according to at least a proximity of the potential order interaction location to the requestor location, and wherein the order interaction location recommendation is further responsive to or includes a quality of service measure for the potential order interaction location; and providing to the order ahead processing system an identification of the order interaction location for use to process the order.

These and other aspects will be apparent to those of ordinary skill in the art.

BRIEF DESCRIPTION OF THE DRAWINGS

FIG. 5A is a flowchart illustrating example operations of a user computing device, in accordance with one or more aspects of the present disclosure.

FIG. 5B is a flowchart illustrating example operations of an order ahead computing device, in accordance with one or more aspects of the present disclosure.

FIG. 5C is a flowchart illustrating example operations of a presence detecting computing device located at a business location, in accordance with one or more aspects of the present disclosure.

FIG. 5D is a flowchart illustrating example operations of an order processing computing device, in accordance with one or more examples of the present disclosure.

FIG. 5E is a flowchart illustrating example operations of an order processing computing device located at a business location to perform an order interaction processing step, in accordance with one or more examples of the present disclosure.

FIG. 6A is a flowchart illustrating example operations of a user computing device, in accordance with one or more aspects of the present disclosure.

FIG. 6B is a flowchart illustrating example operations of an order ahead computing device, in accordance with one or more aspects of the present disclosure.

FIG. 6C is a flowchart illustrating example operations of an order processing computing device, in accordance with one or more examples of the present disclosure.

FIG. 6D is a flowchart illustrating example operations of a presence detecting computing device located at a business location, in accordance with one or more aspects of the present disclosure.

FIGS. 7A and 7B are flowcharts illustrating example operations of a user computing device, in accordance with one or more aspects of the present disclosure.

FIGS. 7C and 7D are flowcharts illustrating example operations of the order ahead computing device, in accordance with one or more examples of the present disclosure.

DETAILED DESCRIPTION

Figure 1:
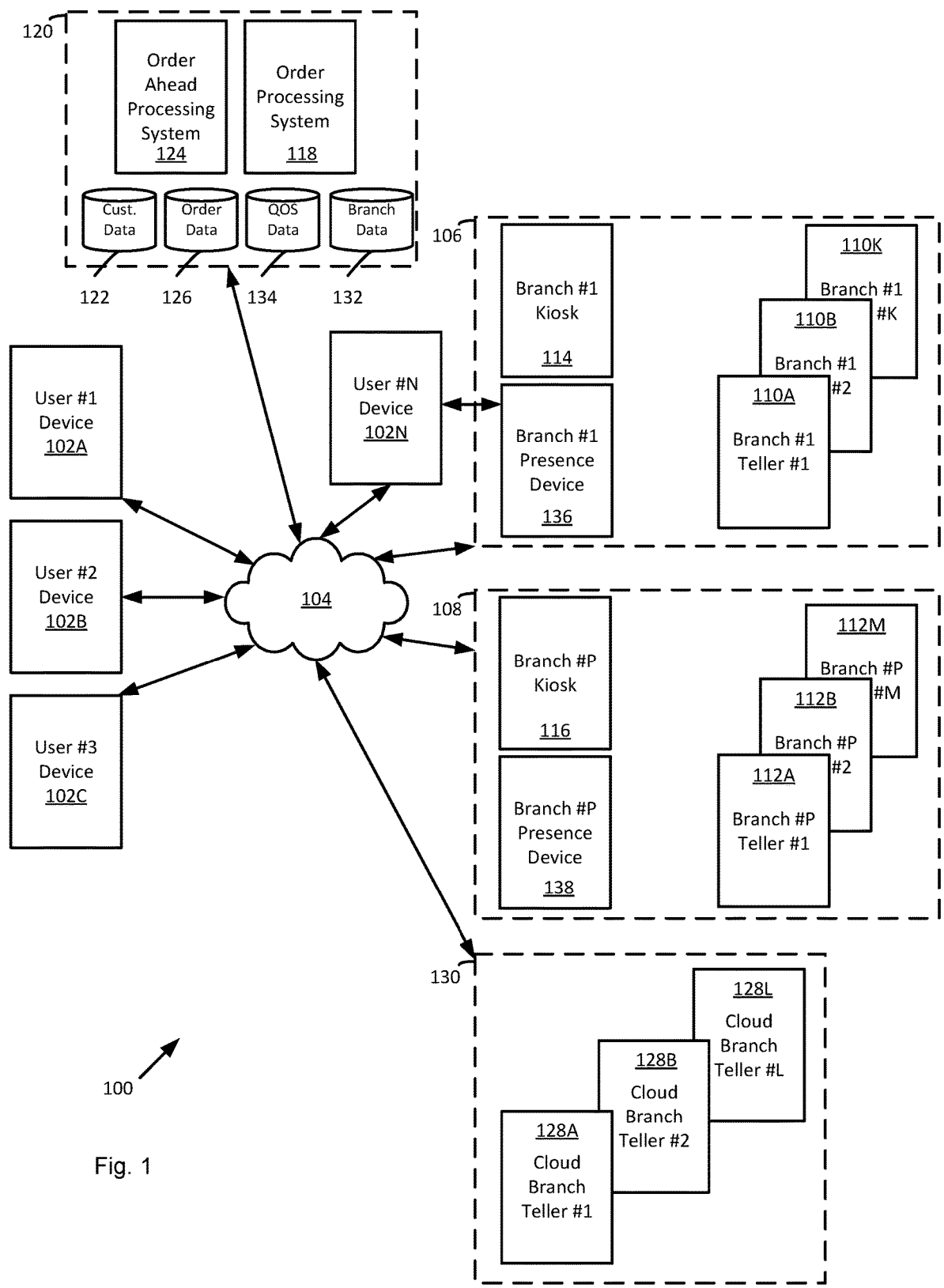
FIG. 1 is a block diagram of a computer network including computer devices at distributed locations providing order processing interfaces to a processing system as well as customer user devices enabled to submit orders ahead of attending at a location via an order ahead processing system, in accordance with one or more aspects of the present disclosure.

FIG. 1 is a diagram illustrating an example computer network 100 in which a plurality of 1, 2, 3, . . . N user computing devices 102A, 102B, 102C . . . 102N are configured to communicate with one or more other computing devices via a communications network 104. The user computing devices are operated by respective users (not shown) having a customer relationship with a business (or other entity). The business provides physical offices or branches at locations distributed about a geographic area such as a city where a user may attend to conduct business. Often the business conducted includes a processing of an order (e.g. a request for a service and/or transaction), which may be submitted on behalf of the customer by an employee of the business using a computing device providing an order processing interface. To process the order, the order processing interface (via its host computing device) communicates with a remotely located computing device providing an order processing system having access to customer data. FIG. 1 shows two example physical offices including a physical office 106 ("Branch #1") and a physical office 108 ("Branch #P") of a plurality "P" such locations. At physical office 106 there are 1, 2, 3, . . . K order processing devices (e.g. teller devices) 110A, 110B and 110K. At physical office 108 there are 1, 2, 3, . . . M order processing devices (e.g. teller devices) 112A, 112B and 112M. Respective branches may have kiosks (e.g. 114, 116) or similarly configured computing devices for operation by a customer to initiate an order for processing. To complete at least some such orders requires attendance with an employee to perform an interaction operation such as is further described.

FIG. 1 shows an order processing system 118 (hosted by a computing device) to process and/or assist with processing an order such as from an order processing interface. The order processing system 118 may be located a remote location 120 relative to at least some of the branch locations, for example for cost and/or security reasons. Order processing system 118 may be coupled to a data store storing customer data 122.

The order processing system 118 may also be configured to process orders from user devices. In a financial context, on-line banking orders may include account look-ups, transfers, bill payments, etc. However, some orders require attendance with an employee to perform and/or complete an order for processing. For example, such an order may be a purchase of a foreign currency, withdrawal of currency over a certain amount, a purchase of a draft or other instrument (e.g. having a physical representation), a mortgage or other loan, a purchase of insurance, etc. Orders that require a physical delivery by either the customer of the business or require a document check such as for regulatory purposes (to confirm identity, etc.) typically require attendance at a physical office or branch to perform an order interaction processing step.

To facilitate users' to initiate orders (e.g. prior to attending with an employee at a physical location where the order includes an order interaction processing step), the business may have a computing device to provide an order ahead processing system 124. Order ahead processing system 124 may communicate with a user device to receive the order and may provide at least some of the customer's customer data (e.g. from customer data 122) to use to define the order. The order is received and stored as order data 126.

Respective orders may be pre-processed such as prior to attendance of a customer at a physical office. An order may be pre-processed by a computing device at a physical location (e.g. 106 or 108). An order may be pre-processed by a remotely located computing device such as one of 1 . . . L computing devices (e.g. 128A, 128B, 128L) provided as a cloud service (as an example) at a remote location 130. Such computing devices 128A, 128B, 128L may automatically process the orders or may involve human intervention. For at least some orders, no or minimal preprocessing may be necessary and such minimal processing may be performed by order ahead processing system 124. In some examples, order ahead processing system may perform all preprocessing.

User devices may store and execute a user application to facilitate orders with the business including order ahead orders where attendance is required for an order interaction processing step. The application may be a native application coded for the operating system, etc. of the user device or a browser based interface, etc.

When defining an order, order ahead processing system 124 may provide a user device (also a requestor device herein) with a recommendation as to which location (e.g. a potential location) to attend to perform the order interaction processing step. The recommendation may be referenced as an order interaction location recommendation. In accordance with the teachings herein, the recommendation may be responsive to a requestor location, that is, location information for the user (e.g. a current location of the user device and/or an input providing a future location of the user) and determine a potential order interaction location or locations (e.g. from branch data 132) proximate to the user. The requestor location may be GPS coordinates, a physical address, etc. The recommendation may also be responsive to a (proposed) time of attendance. The time may be current or closely proximate thereto or a future time, which future time may be provided by the user or suggested by the order ahead processing systems responsive to the order type. Some order types such as a foreign currency purchase may require time to receive the foreign currency at the order interaction location. Other order types may also take time to process. The recommendation is responsive to and/or includes a quality of service measure (e.g. from QOS data 134) to assist the user to select a physical office at which to attend. A recommendation may be responsive to a QOS measure, for example, if the recommendation is ranked higher than another recommendation. By way of example, a recommendation may determine 3 locations in a 2 mile radius and present them ranked 1, 2, 3 based on the QOS measure (and not by proximity). The recommendation (or more than one) may be provided to include a QOS measure, for example, where the 3 locations are provided each with their QOS measure included to facilitate a choice.

The QOS measure may indicate a quality of the customer experience that the customer (i.e. order requestor) may expect to receive when attending at the potential order interaction location (one of the physical offices or branches). The QOS measure is preferably responsive to the proposed time of attendance. The QOS measure may be responsive to an expected measure of busyness at the potential order interaction location. Historical wait times and other data may be collected and stored as QOS data 134, by branch and even by order type. QOS data 134 may include time of day; date; wait times to complete orders at order interaction locations; an order type of the order; measures of order processing volumes relative to respective order interaction locations (e.g. from statistics for order processing system 118 which may comprise measures of processing volumes at respective branches). QOS data 134 may further include requestor ratings for the processing of orders—a direct measure of customer satisfaction, which may include a specific rating for wait time and/or total processing time.

To assist with order processing and/or with the collection of QOS data 134, physical offices (e.g. 106 and 108) may comprise a presence device (e.g. branch #1 presence device 136 and branch #P presence device 138). A presence device may comprise a computing device configured to detect and communicate presence information for customers. Presence may be determined in various manners. A customer may tap their user device and/or a chip enabled card (e.g. via Near Field Communication or the like) to an appropriate reader upon entry. The user device may have a matrix barcode (e.g. a quick response (QR) code) or other code displayed on a display thereof which is provided to an optical reader. The reader may receive identification for the user such as but not limited to a card number, customer number or related number, etc. The user device may be enabled to share location information to a beacon (e.g. via Bluetooth® or other short range communication). The customer may provide biometric information (e.g. finger, face, retina, voice data) to a biometric sensor. The presence device may include or be coupled to communicate with the NFC reader, optical reader, beacon, biometric sensor and/or other interface to the presence device. In another example, the user device may share location information with a remote system which shares same to the business (e.g. to a location system not shown) for determining the presence of the customer at the physical office.

Receiving and identifying a customer may start a wait time and/or processing time clock. The clock or clocks may count time until a customer meets with a teller or other employee and/or finishes with the teller or other employee. Often when a customer meets with the employee, a customer presents credentials in the form of a business-issued card (e.g. having a magnetic strip, and/or chip, etc.) that includes data to identify the customer to an order processing interface. Such data may be stored on the user device for presentation to the employee (for the interface). This act may stop a wait time clock for example. When an order (or all orders) are completed, the completion may stop a total processing time clock. In another example, when the wait time clock is stopped, an order processing time clock may be started and then stopped when the order (or all orders) are completed.

In another example, a presence device may detect when the customer leaves the physical location. The presence device may utilize more than one manner of detecting presence (including for example, detecting discontinued presence or leaving the physical location). For example, a customer may tap in as described to indicate presence but leaving may be detected by facial recognition from images provided by an exit camera. These and other combinations will be apparent.

It is also apparent that presence and exiting (ending presence) may be determined by or in part by the order processing devices at the physical offices. In fact, though the various computing devices herein are described as distinct computing devices, the functions and features thereof may be provided by other computing devices described. For example, the order ahead processing system 124 may be provided by the same computing device as the order processing system 118. A reference herein to "a" such as "a computing device" includes one or more. As such the systems, etc. herein may be provided by one or more computing devices, for example, to balance loads, provide discreet services or functions, etc. Network and other communication equipment is not shown.

In the example of FIG. 1, any of the computing devices defining user #1 device 102A to user #N device 102N is a mobile phone. Other examples of such computing devices may be a tablet computer, a personal digital assistant (PDA), a laptop computer, a tabletop computer, a portable gaming device, a portable media player, an e-book reader, a watch, or another type of computing device; however, as User #N device 102N is shown attending physical office 106, it is a portable device. The other computing devices may comprise similarly configured devices but for order processing system 118 and order ahead processing system 124, the computing devices are business computing devices which may be servers, mainframes, data base systems, etc. in branch devices for order processing are often personal computers, desktops, workstations and the like but need not be.

Though described further the computing devices herein have at least one processing device (e.g. a processor, etc.) and memory (e.g. a storage device, etc.) storing instructions which when executed by the processing device configure the computing device to perform operations.

Communication network 104 which may comprise a wide area network (WAN) such as the Internet. It is understood that communication network 104 is simplified for illustrative purposes. Communication network 104 may comprise additional networks coupled to the WAN such as a wireless network and/or local area network (LAN) (not shown) between the WAN and any of the computing devices. Each of the physical offices 106 and 108 and remote location 130 may have a respective LAN, for example. Devices on such a LAN may communicate externally such as to one or more of systems 124 and 118.

Figure 2:
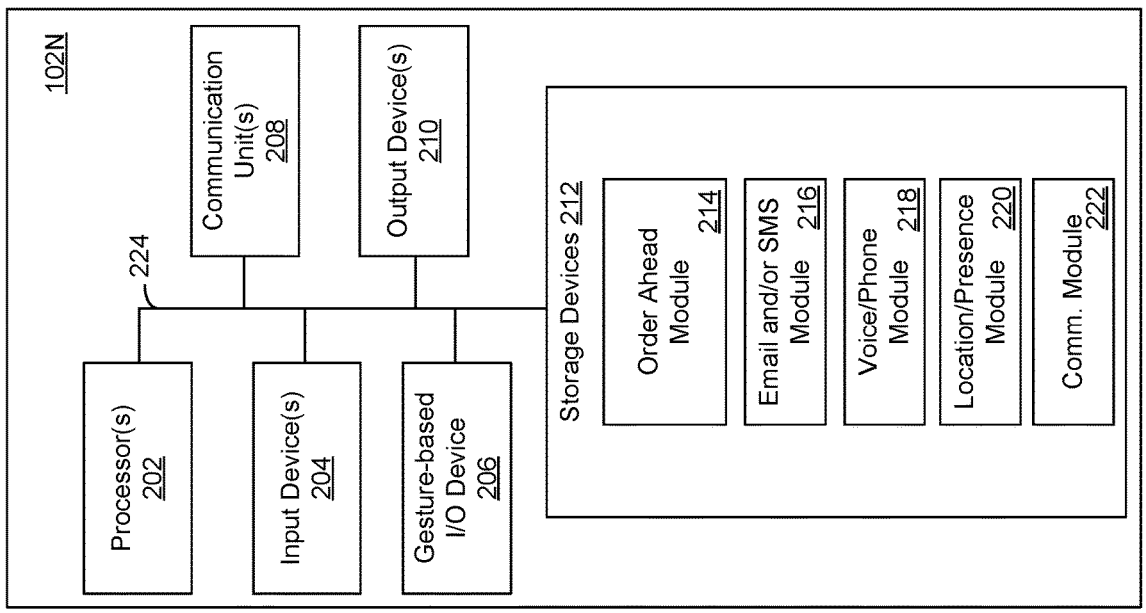
FIGS. 2 and 3 are block diagrams illustrating an example (user) computing device and an example order ahead computing device, in accordance with one or more aspects of the present disclosure.

FIG. 2 is a diagram illustrating in block form an example computing device (e.g. user #N device 102N), in accordance with one or more aspects of the present disclosure. The computing device may be configured as a user device, for example, to request order processing, to provide presence information and/or to receive recommendations in respect or physical office location(s) to attend to complete an order interaction processing step. User #N device 102N comprises one or more processors 202, one or more input devices 204, a gesture-based I/O device 206, one or more communication units 208 and one or more output devices 210. User #N device 102N also includes one or more storage devices 212 storing one or more modules such as order ahead module 214, email or SMS module 216, voice/phone module 218, location/presence module 220, and communication module 222. Communication channels 224 may couple each of the components 202, 204, 206, 208, 210, 212, 214, 216, 218, 220 and 222 for inter-component communications, whether communicatively, physically and/or operatively. In some examples, communication channels 224 may include a system bus, a network connection, an inter-process communication data structure, or any other method for communicating data.

One or more processors 202 may implement functionality and/or execute instructions within User #N device 102N. For example, processors 202 may be configured to receive instructions and/or data from storage devices 212 to execute the functionality of the modules shown in FIG. 2, among others (e.g. operating system, applications, etc.) User #N device 102N may store data/information to storage devices 212. Some of the functionality is described further herein below.

One or more communication units 208 may communicate with external devices (e.g. of order ahead processing system 124, branch #1 presence device 136) via one or more networks (e.g. communication network 104) by transmitting and/or receiving network signals on the one or more networks. The communication units may include various antennae and/or network interface cards, chips (e.g. Global Positioning Satellite (GPS)), etc. for wireless and/or wired communications.

Input and output devices may include any of one or more buttons, switches, pointing devices, cameras, a keyboard, a microphone, one or more sensors (e.g. biometric, etc.), a speaker, a bell, one or more lights, etc. One or more of same may be coupled via a universal serial bus (USB) or other communication channel (e.g. 224).

The one or more storage devices 212 may store instructions and/or data for processing during operation of user #N device 102N. The one or more storage devices may take different forms and/or configurations, for example, as short-term memory or long-term memory. Storage devices 212 may be configured for short-term storage of information as volatile memory, which does not retain stored contents when power is removed. Volatile memory examples include random access memory (RAM), dynamic random access memory (DRAM), static random access memory (SRAM), etc. Storage devices 212, in some examples, also include one or more computer-readable storage media, for example, to store larger amounts of information than volatile memory and/or to store such information for long term, retaining information when power is removed. Non-volatile memory examples include magnetic hard discs, optical discs, floppy discs, flash memories, or forms of electrically programmable memory (EPROM) or electrically erasable and programmable (EEPROM) memory.

Order ahead module 214 may comprise an application (whether native or browser-based) and may be configured to obtain input to perform an action. An action herein is construed broadly as an operation of user #N device 102N or an operation of one or more other computing devices (e.g. one or more servers providing order ahead processing system 124) to which user #N device 102N is coupled. Order ahead module may be a component of a larger module to request orders from order processing system 118. Typically order ahead module 214 is configured to receive and provide authentication to obtain services from the business via electronic means (e.g. requesting orders electronically). Authentication may include a user name and password but may include other data such as biometric data, secret question data, etc.

User #N device 102N may be configured to communicate via data such as email or short message service (SMS or Text message) via email and/or SMS module 216 and via voice, usually in a natural language, through voice/phone module 218. Confirmations and/or invocations from order ahead processing system 124 may be communicated via email and/or SMS. Customer data 122 may store data to enable communications with user #N device 102N.

Order ahead processing system 124 may work via voice interactivity. Voice/phone module 218 may provide voice input to and receive voice output from the order ahead processing system and need not communicate over a telephone connection per se. In other examples, order ahead module 214 may receive voice input via voice/phone module 218 and convert same to text or other input. Order ahead module 214 may provide a graphical user interface (GUI) to display the input and results from order ahead processing system 124. Voice/phone module is a simplified representation and is not to imply or require the existence of a module configured to provide both voice and phone features. In fact, voice and/or phone functionality may be omitted.

User #N device 102N may be configured to provide location and/or presence data such as previously described. Thus location/presence module may take different forms depending on how and to which device/system such information is to be provided. User #N device 102N may be configured to share location data via order ahead module 214 or another module (not shown), to store user authentication or credentials for NFC communication, to communicate presence via short range communications, to display a QR code, etc.

Thought not shown User #N device 102N has an operating systems and typically other modules (e.g. maps, contacts, calendar, etc.).

It is understood that operations may not fall exactly within the modules 214-222 of FIG. 2 such that one module may assist with the functionality of another.

Although the present disclosure illustrates and discusses a gesture-based I/O device 206 primarily in the form of a screen device with IO capabilities (e.g. touchscreen), other examples of gesture-based I/O devices may be utilized which may detect movement and which may not comprise a screen per se. User #N device 102N may receive gesture-based input from a track pad/touch pad, one or more cameras, or another presence or gesture sensitive input device, where presence means presence aspects of a user including for example motion of all or part of the user.

User #N device 102N may generate output for display on a screen of gesture-based I/O device 206 or in some examples, for display by a projector, monitor or other display device. It will be understood that gesture-based I/O device 206 may be configured using a variety of technologies (e.g. in relation to input capabilities: resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology; and in relation to output capabilities: a liquid crystal display (LCD), light emitting diode (LED) display, organic light-emitting diode (OLED) display, dot matrix display, e-ink, or similar monochrome or color display).

In the examples described herein, gesture-based I/O device 206 includes a touchscreen device capable of receiving as input tactile interaction or gestures from a user interacting with the touchscreen. Such gestures may include tap gestures, dragging or swiping gestures, flicking gestures, pausing gestures (e.g. where a user touches a same location of the screen for at least a threshold period of time) where the user touches or points to one or more locations of gesture-based I/O device 206. Gesture-based I/O device 206 and may also include non-tap gestures. Gesture-based I/O device 206 may output or display information, such as graphical user interface, to a user. The gesture-based I/O device 206 may present various applications, functions and capabilities of the user #N device 102N including, for example, messaging applications, telephone communications, contact and calendar applications, Web browsing applications, game applications, e-book applications and financial, payment and other applications or functions among others.

Figure 3:
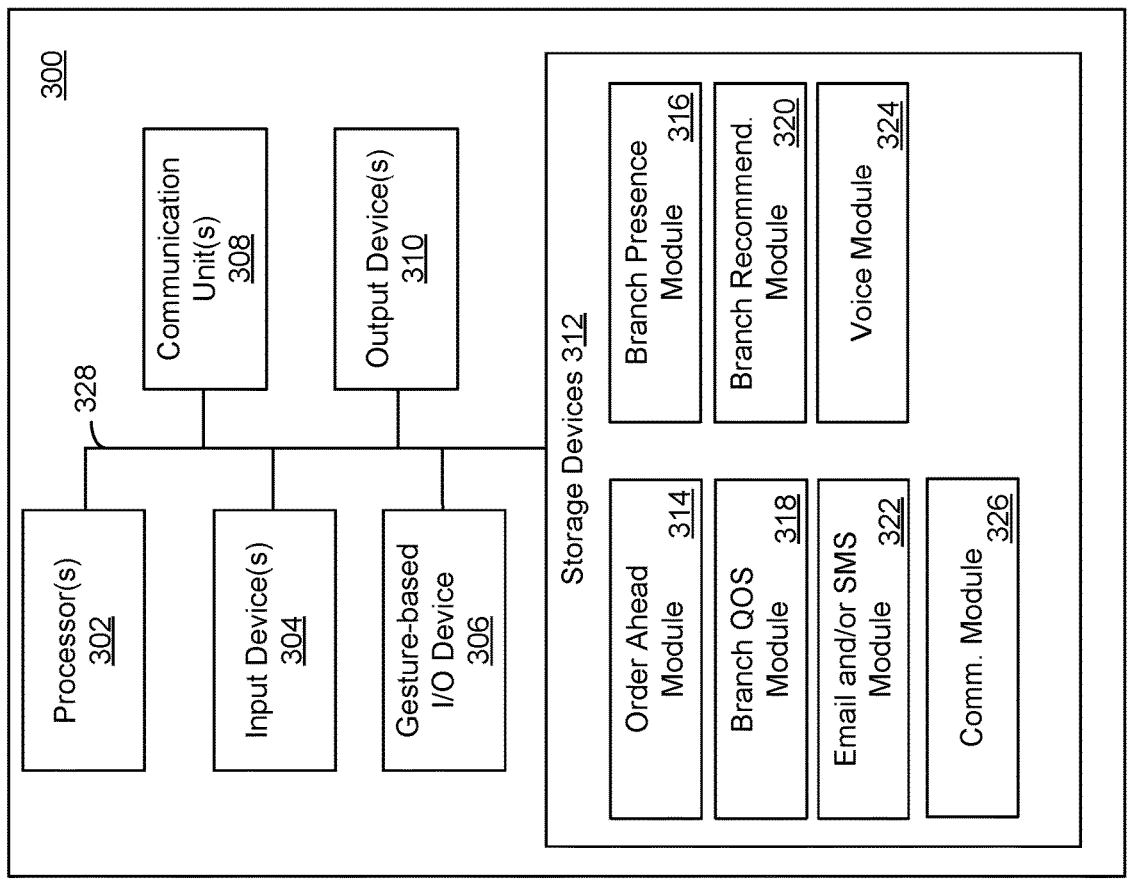

FIG. 3 is a diagram illustrating in block form an example computing device 300 providing order ahead processing system 124, in accordance with one or more aspects of the present disclosure. The computing device is typically a server device may be configured another type of computing device. Computing device 300 is configured to receive and handle order ahead orders, provide recommendations for potential order interaction locations with a quality of service measure, receive and utilize presence information, and store and compute QOS data.

For simplicity computing device 300 is shown in a similar configuration to user #N device 102N where computing device 300 comprises one or more processors 302, one or more input devices 304, a gesture-based I/O device 306, one or more communication units 308 and one or more output devices 310. Computing device 300 also includes one or more storage devices 312 storing one or more modules such as order ahead module 314, branch presence module 316, branch QOS module 318, branch recommendation module 320, email or SMS module 322, voice module 324, and communication module 326. Communication channels 328 may couple each of the components 302, 304, 306, 308, 310, 312, 314, 316, 318, 320, 322, 324 and 326 for inter-component communications, whether communicatively, physically and/or operatively. In some examples, communication channels 328 may include a system bus, a network connection, an inter-process communication data structure, or any other method for communicating data.

Any of the component devices (e.g. 302, 304, 306, 308, 310 and 312) similarly found in user #N device 102N may be similarly provided in computing device 300. It will be understood that such computing device 300 is usually stripped down of input devices, output devices, and/or I/O devices etc. as they are networked devices coupled to a computing device having same.

Order ahead module receives orders from user devices. Order ahead module may receive authentication from a respective user device to permit operation. Order ahead module may provide customer data for use to define an order. Order ahead module may communicate instructions to a user device for a customer requesting an order ("a requestor") to perform prior to attending at a branch location to perform an order interaction processing step. One example is to bring certain required documentation. Order ahead module may communicate a confirmation of order message (e.g. in the form of a QR code encoding data for the order). Order ahead module may communicate recommendations as described.

Branch presence module 316 may receive presence information such as from branch presence devices or other devices (e.g. user devices providing location information), whether directly or indirectly. Branch presence information may be used to relay order data to order processing devices at a branch (e.g. to a queue (not shown) for holding and/or directing processing of orders by order processing devices at a branch). Branch presence information may be used to provide direction information to user devices (e.g. indicating a customer queue or person to see at the branch, etc.). Branch presence information may be used to determine QOS data such as wait times, processing times, or other busyness measures.

Branch QOS module 318 receives data and computes QOS data 134. Branch location module provides recommendations for potential order interaction locations (i.e. branches at which the interaction step is to be performed), using branch data 132 and QOS data 134, etc. Branch data may include location data as well as hours of operations data and services offered data. A recommendation may meet criteria that the location is proximate to the user, is open at the proposed time to attend and offers the services (e.g. related to the order type) which is requested by the user.

In one example, working through the order ahead module, the recommendation may be provided as a map interface showing one or more potential order interaction locations proximate to the user device's current position or the customer's usual branch choice (either or both of which may be stored as customer data 122). Graphical elements (e.g. icons or symbols) indicating respective branches' locations on the map may reflect the respective QOS measures. Selecting a symbol may show further QOS data. An interface may be provided to change the location relative to which the recommendation is made and/or change the proposed time of attendance to obtain recommendations in accordance therewith. In another example, the recommendations may be provided in a list. The list may be ordered (sorted and displayed) by proximate location, QOS measure or other manner. The QOS measure is indicative of busyness thereby to shift processing away from busy locations to less busy locations to better use processing resources.

Order ahead processing system 124, via computing device 300, may communicate such as to user devices, via email and/or SMS using email and/or SMS module 322. Order ahead processing system 124, via computing device 300, may communicate for orders using a voice interactive interface such as using voice module 324. Communications may be coordinate and made via communication module 222 working with communication units 308.

It is understood that operations may not fall exactly within the modules 314-326 of FIG. 3 such that one module may assist with the functionality of another.

Figure 4B:
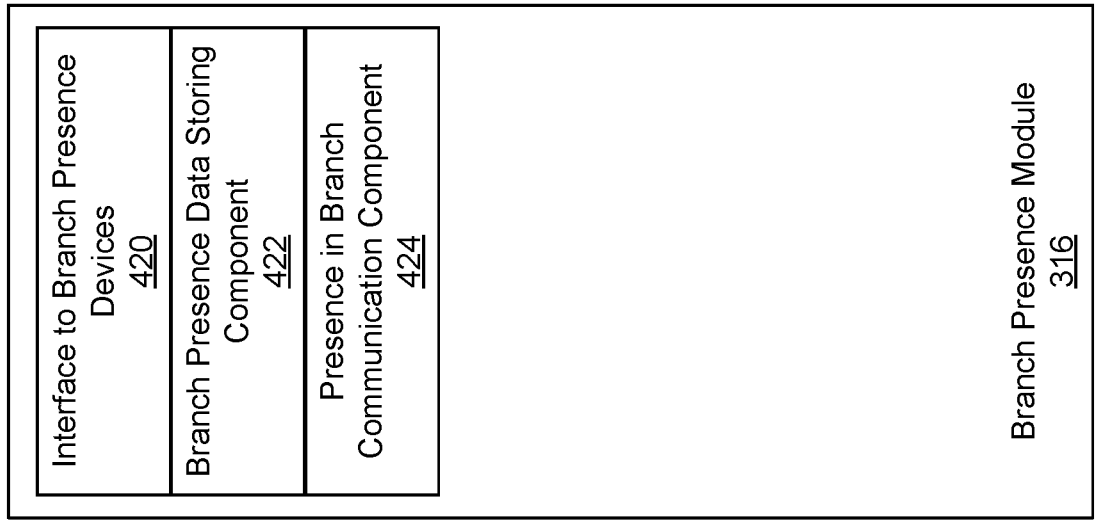
FIGS. 4A-4D are block diagrams showing modules of the order ahead computing device of FIG. 3, in accordance with one or more aspects of the present disclosure.
Figure 4A:
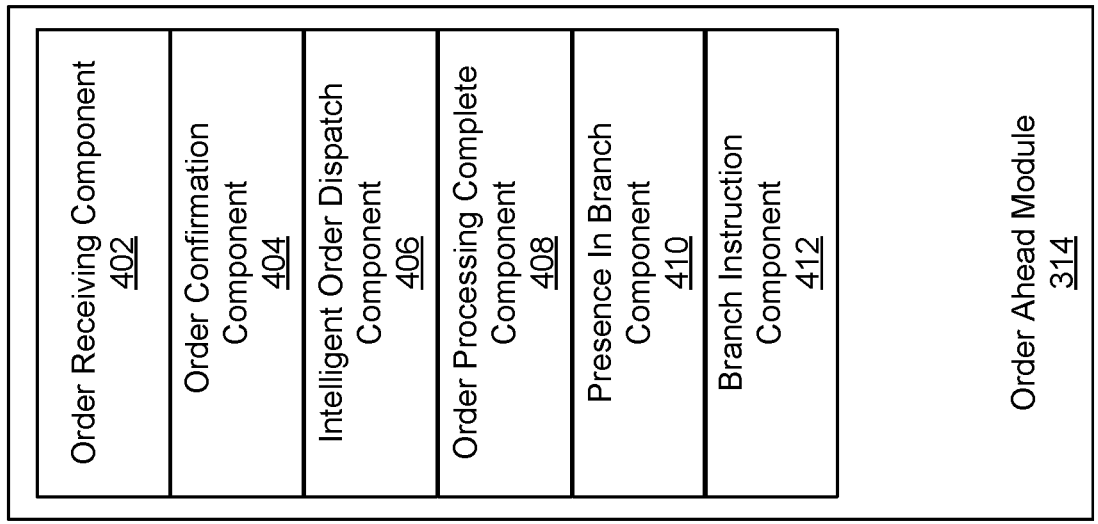

FIGS. 4A-4D show selected modules of the order ahead processing system 124 in more detail comprising various components where component is a descriptor for a part thereof. FIG. 4A shows order ahead module 314 comprising: an order receiving component 402, an order confirmation component 404, an intelligent order dispatch component 406, and order processing complete component 408, a presence in branch component 410, and a branch instructions component 412. Not shown are various interfaces to data such as customer data and order data. Order receiving component 402 receives input from user devices to define and store respective order ahead orders. Such orders comprise those that involve an attendance a location to conduct an order interaction processing step such as a delivery or documents check or physical signature, etc. Order receiving component 402 may receive authentication to enable orders to be defined. Order receiving component 402 may provide a user device with customer data (e.g. account information, amounts, customer name, address, etc.) for use to define the order.

Order receiving component 402 provides a recommendation to the user device as described, for example, working with the branch recommendation module 320 to obtain the recommendation.

Order confirmation component 406 may generate and store and provide a confirmation such as a QR code or other confirmation to the user device once the order is defined and stored. The confirmation may assist a user to present at a branch to complete processing (e.g. the order interaction processing step). The intelligent order dispatch component 406 may direct the order for processing. The order may be directed to the branch where the order interaction processing step is to be completed, another branch or to the cloud branch. Directing may be responsive to the busyness of the order processing devices of the respective branches. For some order types, processing may be commenced before the customer attends at the branch leaving only the order interaction processing step to be performed to complete the order. Such processing may be performed by any order processing device and selecting which to direct the order to may be responsive to the QOS measure for the time between receipt of the order and the proposed time to attend to the branch. If the branch where the customer is to attend is expected to be busy in this period and another branch is less busy (e.g. greater than a minimum threshold of the measure) then the order may be assigned (e.g. to an order processing queue) of another branch. In another example, it is directed to an order processing queue for a non-branch location (e.g. a cloud service). Other queues and arrangements may be contemplated e.g. where the order is directed to a queue for processing by any available order processing device at any branch or non-branch which may be prioritized to complete before the proposed attendance time.

Order dispatch may be responsive to order type, for example to ensure that qualified employees receive the order (e.g. directing a loan order to a loan officer) or directing to a customer's preferred or assigned employee (e.g. for private or personal banking).

Order processing complete component 408 may receive a notification from an order processing device (or on its behalf) that the processing of the order is complete. Some orders types may not have a predicable time to complete or may complete ahead of schedule. Order processing complete component 408 may communicate a notice that the customer may attend to perform the order interaction processing step. Responsive to such a communication it may be offered that the customer can select an updated recommendation to switch an attendance time and/or attendance location. Some order types may not be switched or may only be switched to a new location if sufficient extra time is provided. For example, it may be necessary to obtain at the new location to attend a physical item to provide to the customer.

Presence in branch component 410 may receive information (a presence indicator) that the customer is in a branch (e.g. that user device #N 102 N is in physical office 106). This branch presence information for a customer may be received from branch presence module 314. In an alternative arrangement, presence in branch component 410 that is responsive to branch presence may be within the branch presence module 314.

Branch presence information may be used in various ways. In one example, branch presence information may be used to send an invocation to the user device to invoke the order ahead module to ask the customer if they would like to define a new order. In one scenario, the order ahead module may determine that the customer has no outstanding order in the order data 126. Thus, the customer appears to be attending for a reason other than to complete an order interaction processing step of an existing order. Presence in branch component 410 may determine from QOS data 134 (e.g. real time data), etc. that the branch is currently busy and the projected wait time is long. The invocation may direct the user device to define an order which may be processed while the customer waits with a view to shortening the total processing time at the current location or, following a recommendation, while the customer may go about other business and return later to the same or to a different branch. In either case, order dispatch via intelligent order dispatch component 406 may send the order to a different location for processing in advance of the order interaction processing step with a view to shortening the wait time and/or total processing time.

Branch presence information may be used to trigger (e.g. communicate) requestor instructions via Branch instructions component 412. In an alternative arrangement, branch instructions component 412 that is responsive to branch presence may be within the branch presence module 314.

Branch instructions component 412 my communicate instructions to the user device (requesting device) requesting a particular order. Branch instructions component 412 may communicate such instructions following an order receipt (e.g. responsive to the order type), the instructions may provide the customer with information about what to bring, where to attend, who to see, etc. Branch instructions component 412 may communicate requestor instructions upon detecting presence (e.g. receiving a detection from a presence device) of the customer in a branch. The instructions may provide the customer with information about where to attend, who to see, expected wait times, or to confirm they have the required documents to complete the order, etc.

FIG. 4B shows branch presence module 314 comprising an interface to branch presence devices 420, for example to receive branch presence information communications. This may include a notification that a customer has arrived and/or a notification that they have departed, a signal that an order or other event processing has completed. A customer may attend at a branch for advice or other assistance which may not require an order to be processed such as via an order processing device at the branch. Keeping statistics on such attendance etc. may also be useful for QOS metrics. The interface to branch presence devices 420 may include an interface to a branch processing device monitor (not shown) that signals when an order processed for a customer is completed. Such orders need not be order ahead orders as the branch presence information may be useful to determine QOS data for any type of order processed or other event at a branch. Branch presence information may have time information to determine a start or stop time or duration for example. The information may also include order type, if available, or information identifying a customer to link to an order processed. Branch presence data storing component 422 may store branch presence information for determining (computing) QOS data. Presence in branch communication component 424 may communicate the detection of a customer in a branch to order ahead module 314 such as for the purposes described.

Figure 4C:
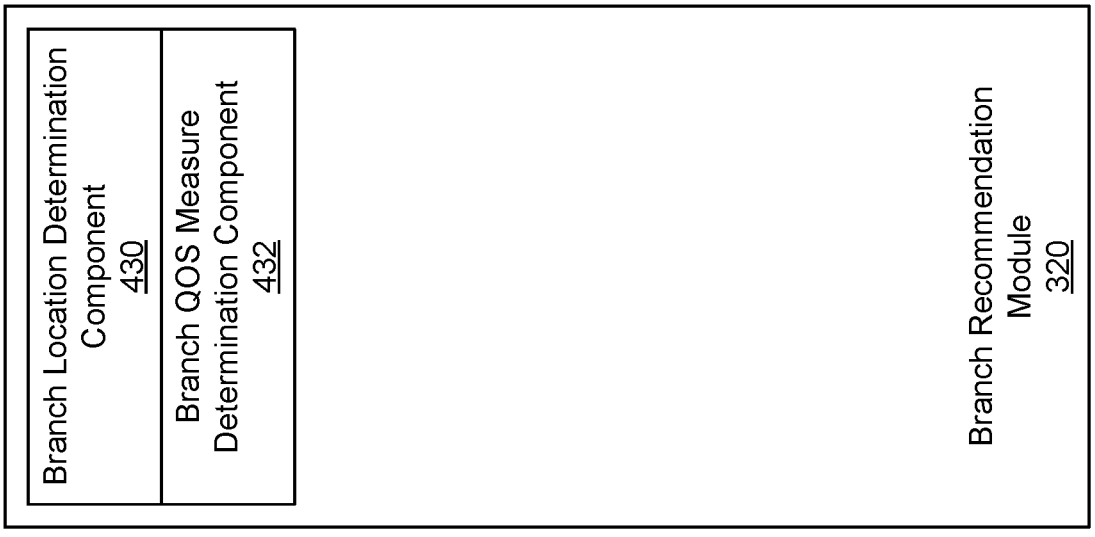

FIG. 4C shows branch QOS module 316 comprising a QOS statistics determination component 426 and a QOS prediction component 428. Not shown are interfaces to various data including for example, branch presence information (data) (which may be stored as a type of QOS data), processing QOS or other statistics data for order processing system 118, and requestor rating data (which may be stored as customer data). QOS data 134 may store initial data from which specific QOS metrics may be determined such as branch presence data, order processing metrics from order processing devices in branches (e.g. related to time taken to process orders, order types, time of day and date, etc.). QOS statistics determination component 426 is configured to compute the QOS metrics using the initial data and earlier computed QOS metrics (e.g. for averages, etc.). QOS metrics may provide average wait and total processing times on a branch basis, by time of day, day of week and more. For example, statistics may be kept or are determinable for days that are proximate to a holiday. Statistics for a Friday around a long weekend where the business is closed on the Monday or statistics for the Tuesday following such a Monday closure may be different then for regular Fridays and Tuesdays in weeks not having a holiday. QOS metrics may measure various key performance indicators. A dashboard or other interface may be provided to present such data. Reports may be generated and shared.

From the QOS metrics, one or more QOS measures may be determined. While a QOS measure may be determined for past times and dates, recommendations are related to future times and dates. Thus such QOS measures for future times and dates may be defined from past QOS metrics or past QOS measures.

At least one QOS measure may be determined to present an easily understood rating regarding the busyness of the branch. The rating may be on a scale (e.g. 1 to 3, 1 to 5, etc.). The scale may be represented graphically (e.g. by colour, icon, line or other graph, etc.) Preferably the QOS measure is determined with such granularity that meaningful information may be understood and, importantly, meaningful predictions of future busyness may be computed with which to generate recommendations (e.g. via QOS prediction component 428). For example, if the customer wants to attend to a branch on Wednesday at 2:00 PM to complete an order related to a loan, there preferably exists a manner to generate such a granular recommendation, for example, that distinguishes date, time, order type. A QOS measure may also be determinable for requestor ratings which may reflect busyness but which may indicate other "soft" factors such as friendliness, overall satisfaction, etc. A requestor rating measuring wait time and/or total processing time may be employed to gather such granular information. The order ahead application, an email or SMS, etc. may prompt the customer (requestor) to complete a rating.

QOS prediction component 428 may be configured to receive a request for a prediction of a QOS measure or measures. Such a prediction may be for (be relative to) a branch, a date, a time and an order type. Fewer factors or additional factors may be used. For example a customer may indicate that they want to attend any day at 10 AM or any time on Thursday of the current week, etc. QOS prediction module may compute the prediction or retrieve same from previously computed and stored QOS data.

While described with reference to an order ahead scenario where a recommendation is provided in the context of defining a specific order, QOS predictive measures and recommendations may be provided to a customer such as through a branch locator interface. Input from a user device may provide a location. Proximate branch location or locations may be determined relative to the location. QOS predictive measures, such has for a current time, may be determined for the one or more locations. The branch locations and associated QOS predictive measures may be communicated to the user device for presentation, for example in a map interface, list interface or other GUI or non-GUI interface.

Figure 4D:
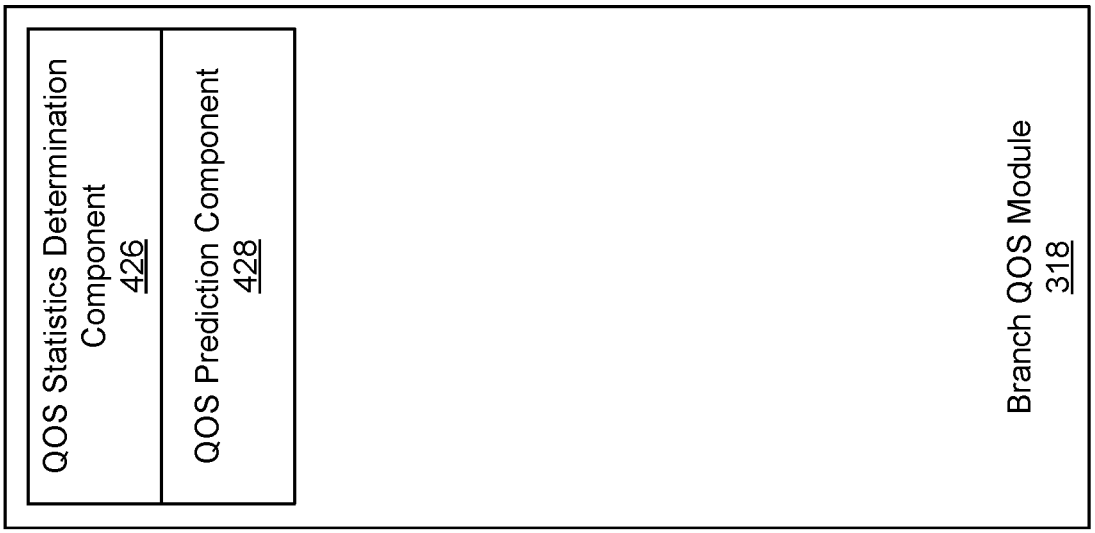

FIG. 4D shows branch recommendation module 320 comprising a branch location determination component 430 and a branch QOS measure determination component 432. A user location may be received. Branch locations may be determined that are proximate to the user location, for example, within a threshold radius. The radius may be user defined or automatic. An initial threshold may be lessened or tightened for example in response to a count of locations within the initial threshold. Branch locations not meeting the order type criteria may be filtered out. QOS measures for the branches located are determined, for example, by the branch QOS measure determination component 432 in conjunction with the branch QOS module 318. Relative to the located branches, QOS measures are obtained. The QOS measure may be responsive to the order type. The QOS measure may be responsive to a proposed time of attendance. Additional QOS metric data may be obtained as well to provide for display of details/more granular QOS data.

FIG. 5A is a flowchart of operations 500 of a computing device providing a user device (e.g. user #N device 102N) to define an order ahead in response to a presence at a branch (e.g. branch #1 106). At 502, there is a communication of presence such as to branch #1 presence device 136. At 504, the order ahead application is invoked, responsive to presence at the branch (e.g. following receipt of a communication from order ahead processing system 124).

At 506, authentication is provided to order ahead processing system 124. At 508 the order is defined and communicated. Details regarding this step are described further with reference to FIG. 7A. At 510, a confirmation (e.g. a code) is received (e.g. from order ahead processing system 124). At 512, a branch instruction is received (e.g. from order ahead processing system 124) and presented. At 514, a requestor rating received order ahead processing system 124.

FIG. 5B illustrates operations 520 of order ahead application 124. At 522, presence in branch of a potential requestor is determined (e.g. upon receipt of a communication from a branch presence device). At 524, a communication is sent the user's device to invoke the order ahead app., for example, to see if an order ahead order can be defined. At 526, authentication is performed (e.g. authentication data received and verified).

At 528, the order is defined and received. The order ahead processing system 124 may communicate customer data for use to define the order. In some instances the order being defined may not require attendance with an employee to perform an order interaction processing step. Transfers between accounts, bill payments and some other orders can be performed electronically without attendance. Invoking the order ahead app (or other order taking application) may reduce resource use of the branch's order processing devices.

At 530, a confirmation code is generated, stored and communicated. At 532, the order is dispatched. At 534 a notification is received that the preprocessing is complete.

Preprocessing may not be necessary for all order types. The notification may trigger a communication of an in branch instruction (or other instruction) to the user's device. Not all order types (or instances of order) may require such an instruction. For orders not involving attendance with an employee the in branch instruction may be information that the order is complete and the customer is free to define and send another order of leave.

At 540, notification is received that the customer has ended presence in the branch. As previously noted, the communication may be relative to the presence device detecting a termination of presence or the branch's order processing device indicating that the order is completed. At 542, the experience rating (requestor rating) is received and stored.

FIG. 5C is a flowchart of operations 550 of the branch #1 presence device 136. At 552 presence is detect and at 554 communicated to the order ahead processing system 124. At 556 end of presence is detected and at 558 communicated to the order ahead processing system 124.

FIG. 5D is a flowchart of operations 560 of an order processing device, whether in branch #1, another branch or not in a branch. At 562, the order is received and processed. The order may be pre-processed if a step involving attendance is to be performed to complete the order. The order may be wholly processed if no attendance is necessary. In some instances, no pre-processing of the order is necessary before attendance.

At 564 a communication that pre-processing is complete is provided to the order ahead processing system 124 for communicating to the user device. The communication may be a communication that all processing is complete or that no processing is necessary. At 566 an in branch instruction is determined and communicated. As noted previously, requestor instructions may relate to an activity for the requestor (customer) to perform prior to attending in branch to complete the order. However, the requestor instructions may be any instructions or information and not relative to a branch per se. The requestor instructions may be a name of an employee to meet such as a loans officer.

FIG. 5E is a flowchart of operations 570 for a branch's order processing device (e.g. 110A, 110B or 110K). At 572 the order interaction processing step is performed as previously described and the order is completed. Order interaction processing is a step where the presence of the order requestor is facilitates completion of the order processing. Presence may facilitate a document presentation and/or identification check, any physical delivery or pick up requirement, a physical signature requirement, etc.

While the scenario of FIGS. 5A-5E relate to an order that was prompted by the presence of a customer in a particular branch, the order interaction processing step may be performed at a different branch. During definition of the order, a recommendation may be provided to attend a different branch, which recommendation is selected by the customer (requestor).

FIGS. 6A-6C are flowcharts relating to an order ahead made spontaneously by a customer and not in response to a prompt because of presence at a branch. Operations for branch presence device are not shown and are the same as those of FIG. 5D.

FIG. 6A is a flowchart of operations 600 for a user device. Steps 602, 604 and 608 are similar to those of steps 506, 508 and 510. At 608, a notification to attend at the branch is provided. This notification may be responsive to the completion of pre-processing, etc. The notification may include instructions, for example, about what to bring to complete the order interaction processing step. The location and time may be reminded to the requestor.

At 610, presence is communicated when attending at the branch. Optionally an in branch instruction is received at 612. Following completion of the order interaction processing step (which may not directly involve the user device), a rating is defined and communicated at 614 rating the experience, preferably regarding wait or process times and busyness.

FIG. 6B is a flowchart of operations 620 for order ahead processing system 124. Steps 622, 624, 626, 628 and 630 are the same as steps 526, 528, 530, 532 and 534. At 632, optionally a notification to attend at the branch may be sent. At 634, a presence notification is received. Presence may be received from an in branch device but may be received (or determined) in another manner. Location may be shared by the user device with the order ahead processing system or a separate location tracking system. In some scenarios, presence in the branch may be communicated to the branch. An in branch instruction may be received in response to communicate to the user device (at 636). At 638, end of presence notification is received. At 650 a rating is received and stored.

FIG. 6C is a flowchart of operations 650 for an in branch order processing device in the branch where the requestor is to attend. Steps 652 and 654 are the same as steps 562 and 564. At 656, an instruction is determined and communicated in response to a presence notification received, where the instruction is for the requestor received via a user device. In this scenario, the presence notification is from the order ahead processing system but could be from another device. At 658, the order interaction processing step is performed. It is understood that portions of the operations may be performed by an order processing device in a different branch or not at a branch, similar to as described with reference to FIGS. 5A to 5E.

FIG. 6D is a flowchart illustrating example operations 660 of a presence detecting computing device located at a business location (e.g. in a branch), in accordance with one or more aspects of the present disclosure. At 662 presence is detected. Presence may be detected as previously described. At 664, presence at the location is notified. A communication may be sent such as to order ahead processing system 124. At 666, end of presence at the location is detected. End of presence may be detected as previously described. At 668. End of presence is notified such as by sending communication to order ahead processing system 124.

FIG. 7A is a flowchart of operations 700 for a user device (e.g. 102N). Requestor data (customer data for the user requesting the order) is received via the order ahead app at 702. The data may include account data, customer name, address, etc. An account may be selected (e.g. chequing). At 704, an order type may be selected (e.g. from a drop down list, etc.) such as "buy foreign currency". The order ahead app may populate at least a portion of the order with requestor data at 706. The specific currency may be identified and the amount. The order ahead processing system may be requested by the order ahead app to provide a current buy rate to determine the order and prompt confirmation (not shown). Ordering foreign currency usually requires an order interaction processing step: attendance to pick up the currency and may require a documents check depending on regulator requirements.

At 708, a location of the user device is provided and a recommendation of a branch location is received as described where the recommendation comprises a QOS measure. This is described in more detail at FIG. 7B. The order ahead processing system 124 determines a recommendation and communicates same to be received at the user device for presentation as described (also at 708). At 710, input is received identifying the location. At 712 the order is communicated to the order ahead processing system 124.

FIG. 7B is a flowchart of operations 720 for a user device (e.g. 102N). At 720, a current location of the user device is provided to the order ahead application and a recommendation with a QOS measure is received. At 724, the recommendation (e.g. branch location data) is presented. The branch location data may be present on a map interface, list interface or other interface as described. The data may be sorted or filtered. The data may be sorted by QOS measure to present a branch location with the highest QOS measure to assist to direct the user to this branch. Branch locations within a radius of X may be determined and sorted or filtered by the QOS measure by the order ahead processing system or by the user device. The QOS measure may be relative to a time to attend. Often for currency purchases a pickup requires a minimal amount of time for the branch to receive the currency if not in stock. The QOS measure may take account for same—be relative to this minimal time or may be related to a current time. In some scenarios the user device may provide a future time (proposed time to pick up) or a proposed future location (at 726). The requestor may be elsewhere at a desired time to attend and provide a relative location proximate to which a recommended location is desired. The recommendation (branch location data) is determined relative to these inputs and is presented (at 728).

The user interface may be configured to provide further QOS metrics regarding the QOS measure. This data may be a more granular explanation of the QOS measure. This data may be communicated with the recommendation or in response to a request for same. It may be included with more details about the branch location—specific hours, location, etc. Thus, at 730, input may be received to invoke a display of QOS details to present more QOS data. At 732 the data is presented (e.g. as an overlay in a box over a map showing the location).

FIG. 7C is a flowchart of operations 740 of the order ahead processing system related to QOS metrics and QOS measures. At 742 QOS statistics (metrics) are determined and stored such as previously described at least with reference to FIG. 4C. At 744, QOS measure predictions (i.e. QOS measures for a current or future time) are determined using the statistics. These statistics may be used to define a model to predict future behavior of the business' customers. The model can be queried, such as by providing a location and at least some of a time, a date and optionally an order type, to show current or future QOS measures as described. In other examples, the model may be asked for top QOS measures regardless of location, etc.

FIG. 7D is a flowchart of operations 750 of the order ahead processing system related to providing a recommendation. At 752, a request in received which is relative to a location and/or time. Other factors (criteria) may also be provided such as order type, etc. At 754 proximate branch locations are determined along with the QOS measures to define a recommendation and are communicated such as described with reference to FIG. 4D.

It understood that an order herein may be a request for a financial transaction and the order interaction processing step may be performed by a teller computing device and the order interaction location may be a business location of a financial institution.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit.

Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium. By way of example, and not limitation, such computer-readable storage media can comprise RAM, ROM, EEPROM, optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a wired or wireless technologies, such are included in the definition of medium. It should be understood, however, that computer-readable storage media and data storage media do not include connections, carrier waves, signals, or other transient media, but are instead directed to non-transient, tangible storage media.

Instructions may be executed by one or more processors, such as one or more general purpose microprocessors, application specific integrated circuits (ASICs), field programmable logic arrays (FPGAs), digital signal processors (DSPs), or other similar integrated or discrete logic circuitry. The term "processor," as used herein may refer to any of the foregoing examples or any other suitable structure to implement the described techniques. In addition, in some aspects, the functionality described may be provided within dedicated software modules and/or hardware. Also, the techniques could be fully implemented in one or more circuits or logic elements. The techniques of this disclosure may be implemented in a wide variety of devices or apparatuses, an integrated circuit (IC) or a set of ICs (e.g., a chip set).

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. The scope of the claims should not be limited by the embodiments set forth in the examples, but should be given the broadest interpretation consistent with the description as a whole.

What is claimed is:

1. A computing device comprising a processor, a storage device storing instructions and a communication component, wherein the instructions, when executed by the processor, configure the computing device to:
   receive from a requesting device an order for processing, the processing including an order interaction processing step to be performed at an order interaction location with an attendance by a requestor of the order, the order interaction location comprising one of a plurality of order interaction locations;
   determine and provide to the requesting device an order interaction location recommendation comprising a potential order interaction location for the attendance from the plurality of order interaction locations, wherein the order interaction location recommendation is responsive to one or more of a requestor location and a time for the attendance and wherein the potential order interaction location is determined according to at least a proximity of the potential order interaction location to the requestor location and wherein the order interaction location recommendation is further responsive to or includes a quality of service (QOS) measure for the potential order interaction location;
   receive from the requesting device an identification of the order interaction location;
   define the order comprising the order interaction location; and
   dispatch the order to be processed a respective order processing device ahead of the order interaction processing step;
   prior to receiving the order,
      in response to a presence of at least one of the requesting device and the requestor at a first order interaction location of the plurality of order interaction locations, receive or determine a presence indicator, associated with the first order interaction location, for at least one of the requesting device and the requestor; and
      responsive to the presence indicator, communicate to the requesting device to invoke an order application executed on the requesting device with which to define the order;
   wherein the potential order interaction location identifies a second order interaction location having a different location than the first order interaction location.

2. The computing device of claim 1 wherein the instructions further configure the computing device to receive, store and determine QOS data for each of the plurality of order interaction locations from which to determine respective QOS measures, the QOS data responsive to at least some of:
   time of day;
   date;
   wait times and/or processing times at the order interaction locations;
   requestor ratings for processing of orders;
   an order type of the order; and
   measures of order processing volumes relative to respective order interaction locations.

3. The computing device of claim 2 wherein the respective QOS measures are a prediction of a quality of service at the time for the attendance.

4. The computing device of claim 3, wherein the order interaction location recommendation comprises data representing a plurality of potential order interaction locations selected in response to respective proximities to the requestor location and a respective QOS measure for each of the plurality of potential order interaction locations.

5. The computing device of claim 1, wherein to dispatch the order comprises dispatching the order for processing by a respective order processing device located at the order interaction location.

6. The computing device of claim 1, wherein to dispatch the order comprises dispatching the order for processing by the respective order processing device located remotely from the order interaction location but at another order interaction location having capacity to process the order before later completion, the respective order processing device storing at least partially completed order data for later completion of the order by a second order processing device located at the order interaction location.

7. The computing device of claim 1, wherein the instructions configure the computing device to receive one or more of a second requestor location and a second time and in response, provide an updated order interaction location recommendation.

8. The computing device of claim 1, wherein the instructions configure the computing device to receive a presence indicator from a presence device located at the first order interaction location, the presence device configured to at least one of:
   determine and communicate the presence indicator responsive to biometric information determined for the requestor; and
   communicate with the requesting device when the requesting device is within the first order interaction location and define and communicate the presence indicator.

9. The computing device of claim 1, wherein the identification of the order interaction location identifies the second order interaction location.

10. The computing device of claim 1, wherein the instructions further configure the computing device to:
   following dispatching the order,
      in response to a presence of at least one of the requesting device and the requestor at the order interaction location, receive or determine a presence indicator for at least one of the requesting device and the requestor;
      receive requestor instructions to provide to the requestor device; and responsive to the presence indicator, maintain QOS data.

11. The computing device of claim 1, wherein to dispatch the order to a respective order processing device comprises submitting the order to an order processing queue for pre-processing by the respective order processing device of a plurality of respective order processing devices configured to pre-process orders and having access to the order processing queue.

12. The computing device of claim 11, wherein the respective order processing device includes a remote order processing device located remotely from the order interaction location and the order interaction processing step is performed by a local order processing device located at the order interaction location.

13. The computing device of claim 1, wherein the order includes a request for a financial transaction and the order interaction processing step is performed by a teller computing device and the order interaction location is a business location of a financial institution.

14. A computing device comprising a processor, a storage device storing instructions, and a communication component, wherein the instructions, when executed by the processor, configure the computing device to:
define and provide an order to an order ahead processing system configured to receive the order from a requesting computing device, the order including an order interaction processing step to be performed at an order interaction location with attendance by a requestor of the order, the order interaction location comprising one of a plurality of order interaction locations;
receive and present from the order ahead processing system an order interaction location recommendation comprising a potential order interaction location for the attendance from the plurality of order interaction locations, wherein the order interaction location recommendation is responsive to one or more of a requestor location and a time for the attendance and wherein the potential order interaction location is determined according to at least a proximity of the potential order interaction location to the requestor location, and wherein the order interaction location recommendation is further responsive to or includes a quality of service (QOS) measure for the potential order interaction location; and,
provide to the order ahead processing system an identification of the order interaction location for use to process the order;
prior to the step to define and provide the order,
communicate with a presence device located at a first order interaction location, the presence device configured to communicate with the computing device when the computing device is within the first order interaction location and define and communicate a presence indicator, associated with the first order interaction location, to the order ahead processing system; and
receive a communication to invoke an order application executed on the computing device and configured to define the order;
wherein the potential order interaction location identifies a second order interaction location having a different location than the first order interaction location.

15. The computing device of claim 14 wherein respective QOS measures are determined from QOS data for each of the plurality of order interaction locations maintained by the order ahead processing system, the QOS data responsive to at least some of:
time of day;
date;
wait times to complete orders at the order interaction locations;
requestor ratings for processing of orders;
an order type of the order; and
measures of order processing volumes relative to respective order interaction locations; and
wherein each respective QOS measure is a prediction of a quality of service at the time for the attendance.

16. The computing device of claim 14, wherein the identification of the order interaction location identifies the second order interaction location.

17. A computer implemented method comprising:
by a processor,
receiving from a requesting device an order including an order interaction processing step to be performed at an order interaction location with an attendance by a requestor of the order, the order interaction location comprising one of a plurality of order interaction locations;
determining and providing to the requesting device an order interaction location recommendation comprising a potential order interaction location for the attendance from the plurality of order interaction locations, wherein the order interaction location recommendation is responsive to one or more of a requestor location and a time for the attendance and wherein the potential order interaction location is determined according to at least a proximity of the potential order interaction location to the requestor location and wherein the order interaction location recommendation is further responsive to or includes a quality of service (QOS) measure for the potential order interaction location;
receiving from the requesting device an identification of the order interaction location;
defining the order comprising the order interaction location; and
dispatch the order to be processed a respective order processing device ahead of the order interaction processing step;
prior to receiving the order,
in response to a presence of at least one of the requesting device and the requestor at a first order interaction location of the plurality of order interaction locations, receive or determine a presence indicator, associated with the first order interaction location, for at least one of the requesting device and the requestor; and
responsive to the presence indicator, communicate to the requesting device to invoke an order application executed on the requesting device with which to define the order;
wherein the potential order interaction location identifies a second order interaction location having a different location than the first order interaction location.

18. The computer implemented method of claim 17, wherein the identification of the order interaction location identifies the second order interaction location.

19. The computer implemented method of claim 17, wherein to dispatch the order comprises dispatching the order for processing by the respective order processing device located remotely from the order interaction location but at another order interaction location having capacity to process the order before later completion, the respective order processing device storing at least partially completed order data for later completion of the order by a second order processing device located at the order interaction location.

\* \* \* \* \*